United States Patent [19]
Asberg

[11] 3,936,105
[45] Feb. 3, 1976

[54] BEARING WITH ONE OR MORE FLANGE-SHAPED RINGS

[75] Inventor: Sture Lennart Asberg, Goteborg, Sweden

[73] Assignee: SKF Industrial Trading and Development Company, B.V., Jutphaas, Netherlands

[22] Filed: Jan. 24, 1974

[21] Appl. No.: 436,318

[30] Foreign Application Priority Data
Feb. 9, 1973  Netherlands.................. 7301926

[52] U.S. Cl. ........................................ 308/187.1
[51] Int. Cl.² .................................... F16C 33/78
[58] Field of Search............. 308/187.1, 187.2, 187

[56] References Cited
UNITED STATES PATENTS

| | | | |
|---|---|---|---|
| 3,028,203 | 4/1962 | Lund et al. | 308/187.1 |
| 3,129,985 | 4/1964 | Watson | 308/187.1 |
| 3,438,639 | 4/1969 | Paulsen | 308/187.1 |
| 3,519,316 | 7/1970 | Gothberg | 308/187.1 |
| 3,614,183 | 10/1971 | Berns et al. | 308/187.1 |
| 3,642,335 | 2/1972 | Takahashi et al. | 308/187.1 |
| 3,767,279 | 10/1973 | Hallerback | 308/187.1 |
| 3,797,899 | 3/1974 | Anderson | 308/187.1 |
| 3,806,212 | 4/1974 | Piva | 308/187.2 |

Primary Examiner—Robert S. Ward, Jr.
Assistant Examiner—Richard A. Bertsch
Attorney, Agent, or Firm—Daniel M. Rosen

[57] ABSTRACT

A bearing is provided with an inner and an outer ring, at least the innerring forming an integral part of a fixing or supporting flange, and rolling elements, arranged between the rings in a bearing-cage. Sealing elements prevent the penetration of dust, dirt and the like, while on the other hand retain the lubricant between the rings. The sealing element further includes a relatively rigid fixing part, the size thereof in radial direction being determined by the maximum eccentric or radial displacement of the rings with regard to one another during the assembly.

15 Claims, 11 Drawing Figures

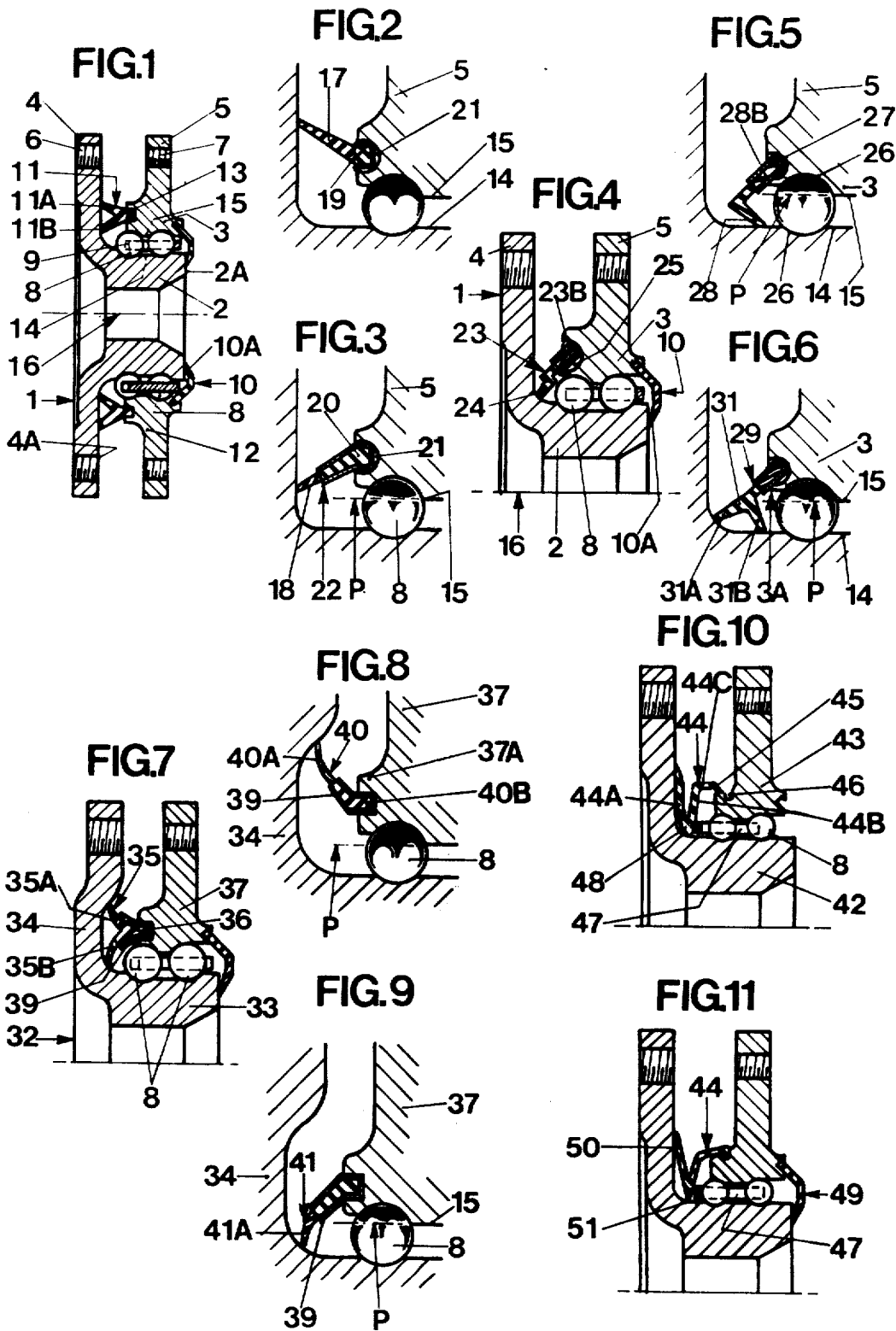

BEARING WITH ONE OR MORE FLANGE-SHAPED RINGS

The invention relates to a bearing, having an inner and an outer ring, with at least the inner ring forming an integral part of a fixing or supporting flange. The rolling element is arranged in the bearing cage between the rings, and includes further a sealing element preventing penetration of dust, dirt and the like, while retaining the lubricant between the rings. Such a bearing is exemplified in the magazine "Machine Design" Nr. 19, Aug. 10, 1972.

Flange shaped bearing rings present special problems, and this invention provides a bearing of the indicated type, whereby the mounting or assembing of the bearing parts into the said bearing — is improved and simplified. To this end, the sealing element, in addition to its sealing effect, will also have an active function during mounting or assembling of the bearing parts. According to the invention a sealing element comprises a relatively rigid fixing part, the size thereof in radial direction being determined by the maximum eccentric or radial displacement of the rings with regard to one another during the assembly. Up till now sealing elements of known type had to be composed completely of a resilient material, safe sealing in addition requiring a complicated shaped seal as well. Such a seal is shown on page 32 of the magazine "Machine Design" No. 19 of August 1972. Consequently, such sealing elements are relatively expensive.

Due to the provisions of the invention it is possible to make the composition, shape and material choice of the sealing element largely dependent, for example on the application of the bearing or the special conditions under which it has to operate.

According to another aspect of the invention the sealing element can now serve, at least during assembling or mounting of the bearing parts, as a mounting member, especially for the bearing cage. This is realised by the fact that the sealing element is designed such that by removing a part of it in the axial direction, a snap-type bearing cage will be pressed around the rolling elements.

The invention will now be described in detail, with reference to the drawing attached, making more apparent various advantages and features thereof.

FIG. 1 is an axial cross-section of the bearing according to the invention.

FIGS. 2 and 3 represent, on an enlarged scale, the fixing of the sealing element to the bearing according to FIG. 1.

FIG. 4 is also an axial cross-section of a part of the bearing provided with other sealing elements.

FIGS. 5 and 6 represent, on an enlarged scale, the fixing of the sealing element, mounted in the bearing according to FIG. 4.

FIG. 7 shows a part of an axial cross-section of another embodiment of a bearing comprising a bent, flange-shaped ring.

FIGS. 8 and 9 represent on an enlarged scale the connection of sealing elements in the bearing shown in FIG. 7. FIGS. 10 and 11 show axial cross-sections of a part of a bearing representing in particular the extended application of a sealing element.

According to FIG. 1 the bearing 1 comprises an inner ring 2 and an outer ring 3, both rings passing over into flanges 4 and 5, respectively. The flanges form a fixing or supporting member and are provided for this purpose with openings 6 and 7, resp., the flanges 4 and 5 are suitable for bolt connection. Between the inner and the outer ring 2 and 3 rolling elements 8 are arranged which are spaced-off from one another by a bearing cage 9. The bearing 1 comprises the sealing elements 10 and 11, which are made of a resilient and wear-resistant material. In this preferred embodiment of the invention the sealing element 10 is made of a material of especially high wear-resistance, which, on the other hand is resilient such that it can ensure an effective sealing for the part 10 A, leaning on the side-wall 2A. This embodiment has the advantage that no special provisions have to be made, such as grooves, edges, ground in a particular manner, etc. in the inner ring 2, because the slightly widening end part 10A abuts under a slight pressure against the flat side surface 2A of the ring.

It will be noted that in the following description identical parts will be indicated by identical reference numbers.

The sealing element 11 comprises two sealing lips 11A and 11B, abutting with their free ends against the flange wall 4A, thereby constituting a safe sealing. The sealing element 11 is already arranged before the assembly of the bearing in the side-wall 12 of the outer ring 3, such that the sealing elements 11A and 11B can lean against the flange wall 4A, while permitting the axial and radial displacement of the bearing ring.

The sealing element 11 furthermore comprises a non-yielding or rigid fixing member 13, for example an annular, widened part, which fits under slight tension in a recess of the side-wall 12 of the outer ring 3. In the sliding face of the inner and outer rings the rolling elements 8 are arranged which are separated from one another by a "ridge" or "dam" 14, 15, of the inner ring 2 and outer ring 3, respectively. It is known that upon assembling or mounting such type of bearing, one of the rings, as a rule the innerring 2, has to be displaced radially or eccentrically with regard to a center line 16 of the outer ring 3, respectively. In such a way that the required number of rolling elements 8 can be introduced between the rings. This eccentrical displacement of one of the rings necessary for "filling" the bearing is determined by the distance of the "ridge" 14, 15 from the rings 2 and 3, respectively. The special form and arrangement of the sealing element 11, according to the invention permits an unimpeded eccentrical or radial movement of the rings with regard to one another; the sealing element 11, introduced beforehand between the flange-shaped rings 2 and 3, respectively does not limit axial and radial displacements. Thus, displacements within the form-limits of the rings are possible, in spite of the fact that a sealing element provided with a rigid part 22 (see FIG. 3) has been arranged therebetween earlier. The sealing element 10 is mounted as a last part of the bearing assembled.

FIGS. 2 and 3 represent the fixing of the sealing elements 17 and 18, which comprise only one sealing lip in this case. The lip 17 is directed towards the outer edge of the flange 4, the lip 18 (See FIG. 3) being directed towards the inner side of the flange 4 or the rolling elements 8 of the bearing 1. The sealing lips 17, 18 form preferably an acute angle with the flange wall 4A of the flange-shaped inner ring 2.

The fixing lips 17 and 18 are provided with a widened resilient fastening part 19 and 20, respectively which fits under slight tension in the recess 21 of the outer ring 3. If necessary a supporting or clamping member 22 can be applied around the end part 19 or 20, whereafter the arrangement is introduced in the recess 21 in such a way that the extremities of this member do not extend beyond the ridge or dam 15. (See the dotted border line p in FIG. 3). The member 22 should preferably be made of thin stainless and resilient metal. Thus the sealing elements 17 and 18 are always so stabilised in the bearing that the maximum eccentrical and radial displacement of the inner ring 2 with regard to the outer ring 3 is not reduced at any time, since neither the widened fastening part 19 and 20, respectively, nor the supporting member 22 will hinder such displacements.

According to the invention the sealing elements 11, 17 and 18 form also holding means for the rolling elements 8. During the introduction of the rolling elements between the rings 2, 3, which are in their extreme eccentric position, it could happen that one or more rolling elements 8 roll in between the rings, making the assembly or mounting procedures much more difficult. This drawback is now eliminated, since in any deviating position of one of both rings with regard to the central line 16, the space between the flange wall 4A and the side-wall 12 of the inner and outer ring, respectively is covered by the sealing element 11, 17 or 18.

FIG. 4 represents a part of the axial cross-section of a bearing according to the invention, whereby the sealing element 23, positioned between the inner ring 2 and the outer ring 3, is executed in bent form and fastened to the lower side of the outer ring 3. The bent end part 24 is arranged approximately in the transition sector of the rolling surface of the innerring 2 towards the flange 4.

The sealing element 23 comprises a widened end part 23B as well, which fits, under slight tension, in a recess 25 of the outer ring 3. The fastening of this sealing element is represented in FIGS. 5 and 6 on a somewhat enlarged scale. According to the view of FIG. 5, an annular recess 27 is provided in the proximity of the sliding face 26 of the ring 3, the widened end part 28B of the sealing element 28 fitting into the recess. A strip or clamp 29 or the like is arranged in the recess 27, for ensuring a reliable support or guiding for the said end part (see also FIG. 6), the said supporting member extending beyond the edge 3A for the optimum support of the sealing element, the widened end part 28B or the supporting member 29 thereby extending beyond the edge 3A only to such an extent that the maximum eccentric displacement of the rings 2 and 3 is not prevented. The dotted line in the extension of the ridge or dam 15 represents the border line of displacement.

FIG. 6 represents the fixing of a sealing element 31, that is provided with two sealing lips 31A and 31B, leaning against the flatly arranged transition sector from the sliding face to the flange of the ring 2, while forming an advantageous combination of double sealing and flexible displacement. The ring 3 is fixed in this embodiment similarly to the fixing arrangement shown in FIG. 5. The bent form of the sealing elements 23, 28 and 31 also facilitates the eccentric displacement of the bearing parts.

FIG. 7 represents a part of axial cross-section of a bearing 32 in accordance with the invention, the flange-shaped inner ring 33 displaying in this case a bent or curved flange-part 34. The bearing 32 is provided with a sealing element 35, the form of which is adjusted to the flange-form. The element 35 fits in the fixing part 36, both being inserted in a groove of the outer ring 37.

The element 35 is also provided with two sealing lips 35A and 35B, which have a bent form as well. The lip 35A is directed towards the outer side of the flange 34, the sealing lip 35B being directed towards the inner side of the flange or the rolling elements 8. The fixing of the end part 36 in the outer ring 37 is effected in the same manner as in case of the bearing represented in FIGS. 1–3. A supporting or clamping member, consisting of a metal strip or a resilient holder 39 can be applied as well. The bent or curved sealing lips 35A and 35B, following a part of the flange wall and leaning towards it, not only ensure a completely free axial and radial displacement of these kind of rings, but also ensure an optimum sealing effect.

FIGS. 8 and 9 represent embodiments of sealing elements, which are adjusted to a bent flange-shaped ring, the sealing elements consisting of a single sealing lip. The view of FIG. 8 represents on an enlarged scale the fixing of the sealing element 40, composed of a single sealing lip, turned with the free end part 40A towards the outer side of the flange 34. The other end part 40B can be provided with a supporting metal holder 39 in the form of a strip, arranged in the side surface 37A of the outer ring 37. Part 40B is made of a different material than part 40A.

FIG. 9 represents a sealing element 41, displaying a single sealing lip which has a bent form as well, while the free sealing end part 41A thereof is directed towards the inner side of the flange 34 or the rolling elements 8. The further details of the fastening of this sealing element are similar to those of the sealing element shown in FIGS. 7 or 8.

It has to be emphasised that the invention is not limited to the embodiments of the sealing elements described herein, but that all kinds of sealing elements can be applied, provided they comply with the basic requirement, that the maximum eccentric or radial displacement of the flange-shaped rings will not be hindered and that the said sealing elements are capable of functioning as a mounting device for the rolling elements at the same time.

FIGS. 10 and 11 represent embodiments of a bearing according to the invention, wherein the sealing element has an additional function. FIG. 10 is a schematic illustration of the bearing in the state of mounting, wherein the flange-shaped rings 42 and 43 and the rolling elements 8 are already assembled. A sealing element 44 abuts against the inner wall of a flange-shaped ring 42, at least the end part 44A of the element 44 being made of a resilient material. The other parts 44B and 44C in connection therewith can be made of a material of lower resilience. Part 44C is provided with a reinforcing rib 45, fitting into the recess 46. The length of the middle part 44B extends somewhat farther, in the radial direction of the bearing, to the sliding face of the ring 42. In addition the bearing comprises a bearing-cage 47, preferably of the type known as the "snape-cage" type. The end part 48 thereof leans against the middle part 44B of the sealing element 44, while the bearing-cage encloses only partly the rolling elements 8. In the represented state of assembly the bearing-cage 47 can easily be arranged around the rolling elements, by means of the sealing element 44, through the maximum displacement of part 44B of the said sealing element. At the same time, the fixing of the sealing element is effected in the ring 43, by introducing part 45 into the recess 46. The final assembly of the bearing, provided with two sealing elements 44 and 49, is shown in FIG. 11. The sealing element 44 also has two linear contacts with the flange-shaped ring 42, which assure a safe sealing.

It should be observed that instead of the mechanical fastening of the sealing element in the bearing, as represented in the embodiments of FIGS. 1 to 11, the sealing element can be fixed, in special cases, to the inner or outer ring, by an adhesive connection with one of the rings. A combination of both kinds of fastenings is also advantageous. It is also pointed out that the invention can be applied, in a particularly advantageous manner, to rolling bearings, having flange-shaped rings and displaying good quality and also the advantage, that they need be filled with lubricant only once, during the mounting or assembly of the bearing. A very special advantage of the invention is that the entire procedure of assembling or mounting the bearing parts into a bearing can be carried out automatically. It means that assembling seals and cages of bearings, for instance according to FIGS. 10 and 11, now can be carried out by apparatus such that the axial movement of the seal 44 by which the cage 47 is snapped on the balls 9 is always carried out under the same conditions.

I claim:

1. A bearing comprising an inner ring and an outer ring, at least said inner ring formed as part of a flange member, a plurality of rolling elements, said inner and outer rings being proportioned to have a maximum displacement with respect to each other for insertion of said rolling elements therebetween during assembly of said bearing, a bearing cage for caging said rolling elements between said inner and outer rings, and first and second sealing means for sealing first and second sides of said rolling elements for retaining lubricant between said rings and inhibiting penetration of foreign particles, said first sealing means being in place during insertion of said roller elements and including a relatively rigid portion and a relatively resilient portion, said rigid portion radially extending between said inner and outer rings over a distance not exceeding said maximum displacement, said resilient portion completing said first sealing means between said inner and outer ring.

2. The bearing of claim 1, wherein said rolling elements are paired and ride about a ridge therebetween on the raceways of said inner and outer rings, said resilient portion of said first sealing means extending from said inner ring to a point on said outer ring at about the same height of said ridge.

3. Bearing according to claim 1, wherein said first sealing means comprises a single sealing lip directed towards the rolling elements.

4. Bearing according to claim 1, wherein said first sealing means comprises two lips extending from the rigid seal portion, one of which is directed towards the open end side of the flange, while the other lip is directed towards the rolling elements.

5. Bearing according to claim 1, wherein, in the axial cross-section of the bearing, said first sealing means develops into a bent lip-end portion which end portion leans against the flange-shaped inner ring, in the proximity of the rolling surface.

6. Bearing according to claim 5, when said first sealing means displays two bends, each terminating against said flange shaped inner ring.

7. Bearing according to claim 5 wherein said first sealing means displays two separate sealing lips leaning, in the proximity of the rolling surface of a ring, against said ring.

8. Bearing according to claim 1, wherein the connection of a sealing means is found in the proximity of the lower side of the outerring.

9. A bearing comprising an inner ring and an outer ring, at least said inner ring formed as part of a flange member, a plurality of rolling elements, said inner and outer rings being proportioned to have a maximum displacement with respect to each other for insertion of said rolling elements therebetween during assembly of said bearing, a bearing cage for caging said rolling elements between said inner and outer rings, and first and second sealing means for sealing first and second sides of said rolling elements for retaining lubricant between said rings and inhibiting penetration of foreign particles, said first sealing means being in place during insertion of said roller elements and including a relatively rigid portion and a relatively resilient portion, said rigid portion radially extending between said inner and outer rings over a distance not exceeding said maximum displacement, said first sealing means forming an active mounting member for containing said rolling elements and bearing cage during insertion of said roller elements during assembly of said bearing, said resilient portion completing said first sealing means between said inner and outer rings.

10. Bearing according to claim 9, wherein connection of said sealing means on a ring is effected by means of an adhesive.

11. Bearing according to claim 10, wherein said first sealing means comprises three parts, each of said parts being successively connected to form a complete seal.

12. Bearing according to claim 11, wherein a first of said parts is connectable to the outer ring, axial movement changing said first part into a radially directed middle part that passes into an opposite directed third part which partly leans against the inner bearing ring flange.

13. Bearing according to claim 12, wherein a snap-cage is provided for separating the rolling elements, said cage being arranged around the rolling elements by the axial movement of said middle seal-part of said first sealing means.

14. Bearing according to claim 10, wherein said bearing-ring includes an annular groove proximate its flange for the connection of said first sealing means.

15. Bearing according to claim 10, wherein connection of said sealing means on a ring is effected by means of a resilient inserting member (mechanical connection).

* * * * *